United States Patent
Green et al.

(12)

(10) Patent No.: US 6,841,600 B2
(45) Date of Patent: Jan. 11, 2005

(54) ENVIRONMENTALLY FRIENDLY ADHESIVES FOR BONDING VULCANIZED RUBBER

(75) Inventors: Christian C. Green, Waterford, PA (US); Douglas H. Mowrey, Titusville, PA (US)

(73) Assignee: Lord Corporation, Cary, NC (US)

( * ) Notice: Subject to any disclaimer, the term of this patent is extended or adjusted under 35 U.S.C. 154(b) by 69 days.

(21) Appl. No.: 10/274,065

(22) Filed: Oct. 17, 2002

(65) Prior Publication Data

US 2003/0119969 A1 Jun. 26, 2003

Related U.S. Application Data

(60) Provisional application No. 60/330,033, filed on Oct. 17, 2001.

(51) Int. Cl.⁷ .................................................. C08K 5/32
(52) U.S. Cl. ....................................... 524/259; 524/417
(58) Field of Search ................................. 524/259, 417

(56) References Cited

U.S. PATENT DOCUMENTS

| | | |
|---|---|---|
| 2,444,536 A | 7/1948 | Searle |
| 2,462,835 A | 3/1949 | Arnold et al. |
| 2,585,115 A | 2/1952 | Greenlee |
| 2,589,245 A | 3/1952 | Greenlee |
| 2,725,373 A | 11/1955 | Reynolds |
| 3,640,941 A | 2/1972 | Findley et al. |
| 3,830,784 A | 8/1974 | Manino et al. |
| 4,119,587 A | 10/1978 | Jazenski et al. |
| 4,124,554 A | 11/1978 | Fry |
| 5,268,404 A | 12/1993 | Mowrey |
| 5,306,740 A | 4/1994 | Laas et al. |
| 5,548,015 A | 8/1996 | Bourlier et al. |
| 6,019,858 A | 2/2000 | Sienkowski et al. |
| 6,268,422 B1 | 7/2001 | Weih et al. |
| 6,512,039 B1 * | 1/2003 | Mowrey ..................... 524/492 |
| 6,627,691 B2 * | 9/2003 | Mowrey et al. ............ 524/492 |

FOREIGN PATENT DOCUMENTS

GB     2 155 488     9/1985

* cited by examiner

*Primary Examiner*—Peter D. Mulcahy
(74) *Attorney, Agent, or Firm*—Miles B. Dearth

(57) ABSTRACT

Adhesive compositions effective for bonding runner to metal and containing no more than about 1000 ppm of lead especially adapted to bond vulcanized elastomers to rigid substrates, like metal are disclosed. The adhesives are useful in combination with primer coats, and as one-coat adhesives and provide durable, rubber tearing primary adhesive bonds after exposure to harsh conditions. The adhesives exhibit excellent bond versatility, sweep resistance, and in-can storage stability. In one embodiment, the adhesive compositions of the present invention consist essentially of less than 1000 ppm of lead, at least one diluent as water or organic solvent, a halogen-containing film former, optionally a nitroso compound, brominated dichlorobutadiene, and/or adhesion promoter, and an acid scavenger comprising zinc phosphate.

15 Claims, No Drawings

ENVIRONMENTALLY FRIENDLY ADHESIVES FOR BONDING VULCANIZED RUBBER

REFERENCE TO RELATED APPLICATIONS

This application claims benefit from the provisional application 60/330,033, filed Oct. 17, 2001.

FIELD OF THE INVENTION

The invention relates to formulated adhesives applied to bond rubber to substrates like metal, during the vulcanization process which generally contain a crosslinking agent and one or more halogenated polymers/film formers, characterized by low levels of lead compounds.

BACKGROUND OF THE INVENTION

Bonding of rubber vulcanizates to substrates, especially metal is conventionally obtained by two-coat primer-overcoat adhesive systems or one-coat primerless systems. In order to provide acceptable bonding, adhesive compositions must exhibit excellent bonding as retention of rubber on the substrate after bond destruction, adequate sweep resistance i.e., ability of the uncured adhesive coating on the substrate to remain undisturbed against the force of injected green rubber into the mold cavity, good storage stability of the wet adhesive and durable adhesion under extreme environmental conditions, typically measured by the hot tear test (ASTM D-429) boiling water and salt spray tests (ASTM B-117-97, for example).

The treatment of metals using zinc phosphate in conversion coating processes is well known, for example as disclosed in U.S. Pat. No. 6,019,858.

In the literature relating to adhesives for bonding rubber to metal (RTM), the following additives such as organosilanes, dispersing agents, adhesion promoting resins such as phenol formaldehyde, crosslinkers such as nitrosobenzenes, and maleimide compounds, carbon black, silica, calcium carbonate, oxides of the metals Al, Ca, Zn, Mg, Pb, Zr, also zirconium salts, e.g. zirconium aluminate, and lead salts of inorganic and/or organic acids, e.g. basic lead carbonate. The use of lead compounds is widely practiced in RTM adhesives because these materials impart essential heat and corrosion resistance of the bond between the vulcanized elastomer and the metal.

U.S. Pat. No. 3,640,941 describes a one-coat rubber-to-metal adhesive containing four essential ingredients: (a) a graft polymer of a polybutadiene and a substituted cyclopentadiene monomer, (b) dibasic lead phosphite, (c) resorcinol and (d) a volatile solvent. In this adhesive system between 25–150 parts by weight of dibasic lead phosphate per 100 parts of polymer is described as necessary to achieve the desired performance.

U.S. Pat. No. 4,119,587 discloses a one-coat adhesive composition comprised of the three essential constituents: (a) halogenated polyolefinic, (b) aromatic nitroso compound, and (c) lead salts.

U.S. Pat. No 5,268,404 discloses adhesives comprising a halogenated polyolefin, an aromatic nitroso compound, metal oxide such as zinc oxide or magnesium oxide, and optionally a vulcanizing agent such as sulfur or selenium, a phenolic epoxy resin, or carbon black.

Lead compounds useful as additive in RTM adhesives provide either an acid scavenging feature and/or corrosion resistance in conjunction with halogenated polymers. Due to the increasing demand from both government and industry to use adhesive materials that do not contain bio-accumulative ingredients. Conventional rubber-to-metal adhesives have required effective amounts of lead compounds and selenium to provide essential resistance to heat and corrosion. It would be desirable to provide adhesives for bonding of rubber to metal during the vulcanization processes that contain less than 1000 ppm of undesirable ingredients such as lead and selenium-containing compounds while at the same time providing comparable heat and corrosion resistance.

The elimination of additives based on lead down to ppm levels presents a problem of finding a suitable replacement that provides for versatile performance in respect to the variety of vulcanizable elastomer types. In addition to the problem of versatility, especially in respect to one-coat adhesive systems, is a general inability to afford optimum adhesion, particularly at elevated temperatures, poor storage stability, poor resistance to pre-bake, poor corrosion resistance and poor resistance of the adhesive bond to environmental conditions such as solvents, moisture and the like.

In view of the potential adverse environmental effects posed by the presence of lead, and in light of the technical challenge for minimizing lead levels, it would be highly desirable if a one-coat rubber-to-metal bonding adhesive composition could be developed which possesses all the aforementioned characteristics without the need of lead compounds.

SUMMARY OF THE INVENTION

A general object of the invention is to provide adhesive compositions containing no more than about 1000 ppm of lead that can bond vulcanized elastomers to rigid substrates, especially metal that provide durable, rubber tearing primary adhesive bonds after exposure to harsh conditions. The adhesives exhibit excellent bond versatility, sweep resistance, and in-can storage stability.

In one embodiment, the adhesive compositions of the present invention consist essentially of less than 1000 ppm of lead, at least one solvent, a halogenated polyolefin, a nitroso compound or brominated dichlorobutadiene, zinc phosphate and optional maleimide compound.

In a specific aspect of the invention there is provided rubber-to-metal adhesive system containing less than about 1000 ppm of lead and consisting essentially of chlorosulfonated polyethylene and/or chlorinated natural rubber, a poly-C-nitroso compound or brominated dichlorobutadiene polymer, carbon black, silica, zinc phosphate, and at least one component selected from the group consisting of a polyisocyanate, epoxy resin, and a maleimide compound.

In another specific aspect of the invention there is provided rubber-to-metal adhesive system containing less than about 1000 ppm of lead and consisting essentially of chlorosulfonated polyethylene and chlorinated natural rubber, a poly-C-nitroso compound, carbon black, silica, zinc phosphate, and at least one component selected from the group consisting of a polyisocyanate, epoxy resin and a maleimide compound.

In another specific aspect of the invention there is provided rubber-to-metal adhesive system containing less than about 1000 ppm of lead and consisting essentially of chlorosulfonated polyethylene and chlorinated natural rubber, brominated dichlorobutadiene polymer, carbon black, silica, zinc phosphate and at least one component selected from the group consisting of a polyisocyanate, epoxy resin and/or a maleimide compound.

In a preferred embodiment, the adhesive comprises
(i) at least one halogen-containing polyolefin, preferably selected from the group consisting of chlorinated natural rubber and chlorosulfonated polyethylene;
(ii) from about 1 to about 200 parts by weight, per 100 parts by weight of said polyolefin, of an aromatic nitroso compound;
(iii) from about 10 to about 120 parts by weight per 100 parts by weight of said halogen-containing polyolefin of zinc phosphate;
(iv) from zero to about 25 parts by weight, per 100 parts by weight of said halogen-containing polyolefin, of at least one maleimide compound, polyisocyanate, epoxy resin and/or chlorinated dichlorobutadiene polymer;
(v) from zero to about 40 parts by weight, per 100 parts by weight of said halogen-containing polyolefin, of a vulcanizing agent selected from the group consisting of sulfur and selenium;
(vi) an inert water or organic solvent diluent, said diluent being present in an amount to provide a liquid composition suitable for use as an adhesive, said liquid adhesive having a total solids content in the range from about 5 to about 80 percent.

The adhesive compositions of the invention are characterized by the unexpected ability to provide strong vulcanized rubber-to-substrate bonds with durability and environmental resistance without the need for priming the substrate surface. However, they can be used with convention substrate primer compositions if one so desires. The compositions provide excellent adhesion for both unvulcanized and vulcanized elastomer compositions, without the need to chlorinate the rubber surface. In addition to affording one-coat adhesive systems characterized by excellent primary adhesion and environmental resistance, the compositions of the invention exhibit excellent shelf-life stability, resistance to in-mold sweep, provide ample pre-bake resistance, good layover characteristics, and are effective over a broad spectrum of bonding temperatures, e.g., from about 90° C. to over 180° C.

DETAILED DESCRIPTION

The vulcanizable rubber substrates bonded by the invention are comprised of vulcanizable rubbers. These rubbers are formulated in numerous recipes, widely available and beyond the scope of this disclosure. Examples of the synthetic rubber used as vulcanizable rubber herein include the following.

(1) Homopolymers of conjugated diene compound such as isoprene, butadiene, and chloroprene. Examples include polyisoprene rubber (IR), polybutadiene rubber (BR), and polychloroprene rubber.
(2) Copolymers of said conjugated diene compound with a vinyl compound such as styrene, acrylonitrile, vinylpyridine, acrylic acid, methacrylic acid, alkyl acrylate, and alkyl methacrylate. Examples include styrene-butadiene copolymer rubber (SBR), vinylpyridine butadiene styrene copolymer rubber, acrylonitrile butadiene copolymer rubber, acrylic acid butadiene copolymer rubber, methacrylic acid butadiene copolymer rubber, methyl acrylate butadiene copolymer rubber, and methyl methacrylate butadiene copolymer rubber.
(3) Copolymers of olefin (such as ethylene, propylene, and isobutylene) with diene compound. Examples include isobutylene-isoprene copolymer rubber (IIR).
(4) Copolymers (EPDM) of olefin with non-conjugated diene. Examples include ethylene-propylene-cyclopentadiene terpolymer, ethylene-propylene-5-ethylidene-2-norbornene terpolymer, and ethylene-propylene-1,4-hexadiene terpolymer.
(5) Polyalkenamer obtained by ring opening polymerization of cycloolefin. Examples include polypentenamer.
(6) Rubber obtained by ring opening polymerization of oxirane. Examples include polyepichlorohydrin rubber vulcanizable with sulfur.
(7) Polypropylene oxide rubber.

Additional examples include their halides, such as chlorinated isobutylene-isoprene copolymer rubber (Cl-IIR) and brominated isobutylene-isoprene copolymer rubber (Br-IIR). Other examples include polymers obtained by ring opening polymerization of norbornene. The above-mentioned rubber may be blended with a saturated elastomer such as epichlorohydrin rubber, polypropylene oxide rubber, and chlorosulfonated polyethylene.

Essential in the adhesive is a halogenated film former, such as halogen-containing polyolefin film formers. These include natural or synthetic elastomers. The halogens employed in the halogenated polyolefinic elastomers will usually be chlorine or bromine, although fluorine can also be used. A combination of halogen atoms can also be employed in which case the halogen-containing polyolefinic elastomer will have more than one halogen substituted thereon. The amount of halogen does not appear critical and can range from as low as about 3 weight percent to more than 70 weight percent, depending on the nature of the base polymer. Halogen-containing polyolefinic elastomers and their preparation are well known in the art and no need is seen to elucidate in any detail on these materials or their manufacture. Representative halogen-containing polyolefinic elastomers include, without being limited thereto, chlorinated natural rubber, chlorine- and bromine-containing synthetic rubbers including polychloroprene, chlorinated polychloroprene, chlorinated polybutadiene, chlorinated butadiene styrene copolymers, chlorinated ethylene propylene copolymers and ethylene/propylene/non-conjugated diene terpolymers, chlorinated polyethylene, chlorosulfonated polyethylene, copolymers of α-chloroacrylonitrile and 2,3-dichloro-1,3-butadiene, chlorinated poly(vinyl chloride), and the like, including mixtures of such halogen-containing elastomers. Thus, substantially any of the known halogen-containing derivatives of natural and synthetic elastomers can be employed in the practice of this invention, including mixtures of such elastomers. Chlorosulfonated polyethylene elastomers alone or in combination with chlorinated rubber are the most preferred halogen-containing film former. Chlorosulfonated polyethylene containing 35%, and 43% (wt.) of chlorine are commercially available from E. I. DuPont de Nemours & Co. under the HYPALON® mark. Chlorinated natural rubber is commercially available from Bayer Aktiengesellschaft, under the PERGUT® mark, and LFE, Inc. under the Aquaprene® mark. A combination of chlorinated natural rubber and chlorosulfonated polyethylene is a particularly beneficial film former. If chlorinated polyolefin (CPE) is employed as a primary film former, the chlorine content should be greater than about 60 percent and the CPE molecular weight greater than about 500. Such chlorine contents can be obtained by a process involving the dispersion and chlorination of high surface area polyolefinic particles in an aqueous medium taught in U.S. Pat. No. 5,534,991.

A supplemental film former is used in some of the embodiments according to the invention. These are based on a brominated polymer of 2,3-dichloro-1,3-butadiene; 1,3-butadiene; 2,3-dibromo-1,3-butadiene; isoprene; 2,3-dimethylbutadiene; chloroprene; bromoprene; 2,3-dibromo-1,3-butadiene; 1,1,2-trichlorobutadiene; cyanoprene; hexachlorobutadiene and combinations thereof. It is particularly preferred to use 2,3-dichloro-1,3-butadiene as the monomer as a homopolymer or copolymer wherein a major portion of the co-polymer contains repeating units from 2,3-dichloro-1,3-butadiene. "Copolymerizable monomers" herein refers to monomers which are capable of undergoing copolymerization with the butadiene monomers described above. Typical copolymerizable monomers useful in the supplemental film former include α-haloacrylonitriles such as α-bromoacrylonitrile and α-chloroacrylonitrile; α,β-unsaturated carboxylic acids such as acrylic, methacrylic, 2-ethylacrylic, 2-propylacrylic, 2-butylacrylic and itaconic acids; alkyl-2-haloacrylates such as ethyl-2-chloroacrylate and ethyl-2-bromoacrylate; styrene; styrene sulfonic acid; α-halostyrenes; chlorostyrene; α-methylstyrene; α-bromovinylketone; vinylidene chloride; vinyl toluenes; vinylnaphthalenes; vinyl ethers, esters, and ketones such as methyl vinyl ether, vinyl acetate, and methyl vinyl ketone; esters, amides, and nitriles of acrylic and methacrylic acids such as ethyl acrylate, methyl methacrylate, glycidyl acrylate, methacrylamide, and acrylonitrile; and combinations of such monomers.

Preparation of brominated polydichlorobutadiene is well known and taught in U.S. Pat. No. 2,725,373. Rubber-like products are obtained by bromination of allylic sites on polydichlorobutadiene polymers with free bromine or with brominating agents, such as N-bromosuccinimide (NBS) for example, in organic, preferably chlorinated solvents optionally inert to bromine, for example in chloroform, tetrachloromethane, chlorobenzene or even benzene. For a bromine content of 16 to 27% by weight, these thermoplastic rubber-like products are readily soluble in typical solvents. The brominated polydichlorobutadiene polymers are incorporated either as a solvent solution in organic diluent embodiments, or for water-based diluents, incorporated by forming a latex according to methods known in the art. The brominated polymer can be dissolved in a solvent, a surfactant can be added with water to the solution, and a phase-inversion under high shear is carried out, followed by removal of the organic solvent to obtain a latex having a total solids content of from about 10 to 60, preferably 25 to 50 percent by weight. Solutions of copolymers of brominated dichlorobutadiene in chlorinated aliphatic or aromatic solvents are readily prepared.

Alternatively, a latex polymer can also be prepared by emulsion polymerization of chlorinated ethylenically unsaturated monomers via conventional emulsion polymerization process and brominated in the aqueous phase without the disperse particles coagulating or precipitating, according to U.S. Pat. No. 5,306,740. A preferred protective colloid for the latex is polyvinyl alcohol as described in more detail in U.S. Pat. No. 6,268,422, incorporated herein by reference. A 2,3-dichlorobutadiene: α-bromoacrylonitrile copolymer (55–80 wt. %: 45–20%, respectively) with polyvinyl alcohol protective colloid is a preferred aqueous dispersion for supplemental film formers in aqueous adhesive embodiments.

In one adhesive embodiment an aromatic nitroso compound is included with halogen-containing polyolefin film former, zinc phosphte or Zn/Al/phos. Another adhesive embodiment comprises halogen-containing polyolefin film former, zinc phosphte or Zn/Al/phos, a nitroso compound and one or more than one adhesion promoter specified below. The nitroso compound can be any aromatic hydrocarbon, such as benzenes, naphthalenes, anthracenes, biphenyls, and the like, containing at least two nitroso groups attached directly to non-adjacent ring carbon atoms. More particularly, such nitroso compounds are described as poly-C-nitroso aromatic compounds having from 1 to 3 aromatic nuclei, including fused aromatic nuclei, having from 2 to 6 nitroso groups attached directly to non-adjacent nuclear carbon atoms. The nuclear hydrogen atoms of the aromatic nucleus can be replaced by alkyl, alkoxy, cycloalkyl, aryl, aralkyl, alkaryl, arylamine, arylnitroso, amino, halogen, and like groups. The presence of such substituents on the aromatic nuclei has little effect on the activity of the poly-C-nitroso compounds in the present invention. As far as is presently known, there is no limitation as to the character of the substituent, and such substituents can be organic or inorganic in nature. Thus, where reference is made to "DNB", this collectively refers to poly-C-nitroso or di-C-nitroso aromatic compound, benzenes, or naphthalenes, and is understood to include both substituted and unsubstituted nitroso compounds, unless otherwise specified.

The preferred poly-C-nitroso materials are the di-nitroso aromatic compounds, especially the dinitrosobenzenes and dinitrosonaphthalenes, such as the meta- or para-dinitrosobenzenes and the meta- or para-dinitrosonaphthalenes. Particularly preferred poly-C-nitroso compounds are characterized by the formula $(R)_m$—Ar—$(NO)_2$ wherein Ar is selected from the group consisting of phenylene and naphthalene; R is a monovalent organic radical selected from the group consisting of alkyl, cycloalkyl, aryl, aralkyl, alkaryl, arylamine and alkoxy radicals having from 1 to 20 carbon atoms, amino, or halogen, and is preferably an alkyl group having from 1 to 8 carbon atoms; and m is zero, 1, 2, 3, or 4. Preferably m is zero. DNB is incorporated into the adhesive composition by addition as a solvent dispersion. The nitroso compound may be replaced by the corresponding oxime or the corresponding nitro compound with the appropriate oxidation/reduction agent.

Exemplary non-limiting embodiments of poly-C-nitroso compounds which are suitable for use in the practice of the invention include m-dinitrosobenzene, p-dinitrosobenzene, m-dinitrosonaphthalene, p-dinitrosonaphthalene, 2,5-dinitroso-p-cymeme, 2-methyl-1,4-dinitrosobenzene, 2-methyl-5-chloro-1,4-dinitrosobenzene, 2-fluoro-1,4-dinitrosobenzene, 2-methoxy-1-3-dinitrosobenzene, 5-chloro-1,3-dinitrosobenzene, 2-benzyl-1,4-dinitrobenzene, and 2-cyclohexyl-1,4-dinitrosobenzene. Amount of aromatic dinitroso compound used in the adhesive may be from 1 to 200 parts by weight per 100 parts of halogenated polyolefin and preferably from 50 to 150 parts. Nitroso compounds are typically provided as 20–45 wt. % dispsersion in aromatic or chlorinated aromatic solvent.

Adhesives according to the preferred embodiments further comprise at least one adhesion promoter, such as phenolic resin solutions, or dispersions, diisocyanates, polyisocyanates, epoxy resins, and/or epoxy-phenolic resins which are known and commercially available. Generally from 1–200 wt. parts of adhesion promoter is preferably present, per 100 wt. parts of halogen-containing film former (PHR). Polyisocyanates include blocked polyisocyanate and an unblocked polyisocyanates as aliphatic or cycloaliphatic polyisocyanates or adducts thereof. In especially preferred embodiments, a water-dispersible isocyanate as an isocyanurate group containing-polyisocyanate based on 1,6-hexamethylene diisocyanate is selected. IN non-aqueous embodiments, polymethylene phenylisocyanate is preferred.

The polyisocyanate in the adhesive composition of the invention can be used in an amount of about 5% to about 55%, preferably 20 to 40%, more preferably about 25 to about 35 percent by weight, based on the total weight of the solid components of the composition. Adhesive in a total solids content of from 20–50 wt. % can contain of di-, or poly-isocyanate from 1% to 25%, preferably from 4%–20% by wt. On a PHR basis, the amount can range from 1 to 200 PHR on 100 wt. parts halogen-containing film former.

In embodiments utilizing a diluent (carrier) primarily of water, polyisocyanates should be rendered more hydrophilic by chemically modifying the polyisocyanate structure to add a hydrophilic group thereto, or by mixing the polyisocyanate with an external emulsifier, or both. Preferably the polyisocyanate is rendered hydrophilic by the addition of the polyisocyanate with a non-ionic ethylene oxide unit-containing polyether alcohol. When an external emulsifier is used, the emulsifier also preferably is the reaction product of the polyisocyanate with a non-ionic ethylene oxide unit-containing polyether alcohol as taught in U.S. Pat. No. 5,717,031, incorporated herein by reference. Exemplary polyisocyanates are 1,4-diisocyanatobutane, 1,5-diisocyanato-2,2-dimethylpentane, 2,2,4- and 2,4,4-trimethyl-1,6-diisocyanatohexane, 1,10-diisocyanatodecane, 4,4'-diisocyanato-dicyclohexylmethane, 1,6-hexamethylene diisocyanate, 1,12-dodecane diisocyanate, cyclobutane-1,3-diisocyanate, cyclohexane-1,3- and/or 1,4-diisocyanate, 1-isocyanato-3,3,5-trimethyl-5-isocyanatomethyl cyclohexane (isophorone or IPDI). An exemplary hydrophilically modified polyisocyanate compound is available from Bayer Inc. of Pittsburgh, Pa., under the trade designation Desmodur® and from Mobay Chemical Corporation under the designation Mondur®. Representative Desmodur® compounds are described as a water-dispersible, solvent free polyisocyanate based on hexamethylene diisocyanate (HDI) having a NCO content of 18.5 to 20.5%.

Another adhesion promoter is the class of phenolic resins that are suitable for inclusion in the adhesives of the invention. Phenolic resins are well known compositions, and include water insoluble, or water-dispersible resoles or novolaks. The resoles employed are normally base catalyzed resins having a formaldehyde factor (i.e., parts, by weight, of 40 weight percent aqueous formaldehyde per 100 parts by weight of unsubstituted phenol) of the order of about 90 to about 180. A novolak is used in conjunction with formaldehye or a formaldehyde source, such as those known, and described in U.S. Pat. No. 5,268,404.

Phenolic resins are condensates of phenol, substituted phenols, or mixtures thereof and aldehyde. Example starting materials include cresol, bisphenol-A, para-substituted phenols such as para-t-butylphenol, para-phenylphenol, and the like. Ordinarily, formaldehyde or a material that generates formaldehyde in situ is the aldehyde that is employed to make the phenolic resin. Phenolics are dissolved in organic carrier in solvent-based adhesive embodiments herein, or dispersed in water with aqueous adhesive embodiments herein.

A suitable phenolic resin for use in the invention is a resole produced by reacting formaldehyde with bisphenol-A in a mol ratio of from about 2 to about 3.75 moles of formaldehyde per mole of bisphenol-A, in the presence of a catalytic amount of an alkali metal or barium oxide or hydroxide condensation catalyst, the reaction being carried out at elevated temperatures. The condensation reaction product is then neutralized to a pH of from about 3 to about 8. An exemplary novolak resin is para-substituted phenol such as para-t-butylphenol or para-phenyl-phenol condensate with formaldehyde. Another exemplary phenolic is a novalak of a mixture of 20 percent by weight of phenol and 80 percent by weight of t-butylphenol condensed with formaldehyde at a formaldehyde factor of 50, in the presence of an acid catalyst. Another suitable phenolic resin for use in the invention is a resole produced by reacting formaldehyde with bisphenol-A in a mol ratio of from about 2 to about 3.75 moles of formaldehyde per mole of bisphenol-A, in the presence of a catalytic amount of an alkali metal or barium oxide or hydroxide condensation catalyst, the reaction being carried out at elevated temperatures. The condensation reaction product is then neutralized to a pH of from about 3 to about 8.

The phenolic resin that is employed need not be pulverized or ground to a very fine particle size, and it need not be dissolved in an organic solvent, prior to utilization in the process of the invention in the preparation of the aqueous dispersion. A coupling solvent is preferably used, as taught in U.S. Pat. No. 5,268,404, incorporated by reference. An exemplary coupling solvent such as alcohols having a boiling point above 100 C., glycol ethers, ethers, and esters. Specific examples of useful coupling solvents include ethanol, n-propanol, isopropyl alcohol, ethylene glycol monobutyl ether, ethylene glycol monoisobutyl ether, ethylene glycol monomethyl ether acetate, diethylene glycol monobutyl ether, diethylene glycol monoethyl ether acetate, propylene glycol monopropyl ether, methoxy acetone, and the like.

Phenolic resins are conventionally dispersed in water using a conventional colloidal protective material. A preferred colloidal protective material is hydrolysed polyvinyl acetate, having a hydrolysis level of 85 to 95 percent and viscosity at 4% solids in water of 4 to 25 mPa at 25° C. Exemplary polyvinyl alcohol-stabilized phenolic resin dispersions are described in U.S. Pat. No. 4,124,554, incorporated herein by reference.

A particularly preferred aqueous dispersion of phenolic resin comprises a hydrophilic phenolic resole, etherified bis-phenol having a methylol functionality of from 1 to about 3.5, and low level of water-miscible cosolvent. Water miscible co-solvents include diethylene glycol butyl ether, 2-butoxyethanol in an amount within the range from about 0.01 wt % to about 10 wt. % of theresin components. The etherified bis-phenol can be suitably employed on a solids basis in an amount of from 10 wt. parts to 55 wt. parts with 90 to 45 wt. parts of a hydrophilic phenolic resole, as is used in Example 2 below (phenolic dispersion). More preferably 20 wt. parts to 40 wt. parts of etherified bis-phenol is combined with 80 to 60 wt. parts of the hydrophilic phenolic resole, cosolvent, and colloidal protective additive. In a more preferred adhesive embodiment, chlorosulfonated polyethylene latex, phenol-formaldehyde resole, butylated Bis A-formaldehyde adduct PVOH, an Zn/Al phosphate are combined as a stable aqueous dispersion. Methods for preparing preferred phenolic aqueous dispersions are disclosed in U.S. Pat. No. 5,548,015, incorporated herein by reference.

Another suitable adhesion promoter is a maleimide compound. Maleimide can be used alone with halogenated film former and zinc phosphate, or Zn/Al phosphate, or preferably in combination with halogenated film former, a nitroso compound, and zinc phosphate, or Zn/Al phosphate metal scavenger. Maleimide adhesion promoters include any of the maleimide, bis- or poly-maleimide and related compounds such as are described in U.S. Pat. Nos. 2,444,536 and 2,462,835, incorporated by reference. The maleimide compound used herein may be an aliphatic or aromatic polymaleimide and must contain at least two maleimide groups. Preferred maleimide compounds include the N,N'linked bismaleimides which are either joined directly at the nitrogen atoms without any intervening structure or in which the nitrogen atoms are joined to and separated by an intervening divalent radical such as alkylene, cycloalkylene, oxydimethylene, phenylene (all 3 isomers), 2,6-dimethylene-4-alkyphenol, or sulfonyl, m-phenylene-bis-maleimide is a presently preferred compound, and is available as "HVA-2" from E. I. du Pont de Nemours and Co., (Inc.). Alternatively a polymaleimide can be used, such as BMI-M-20 polymaleimide supplied by Mitsui Toatsu Fine Chemicals, Incorporated. The amount of maleimide compound used in some embodiment adhesives may be from 1 to 100 parts by weight per 100 parts (PHR) of halogen-containing polyolefin, preferably 5 to 100 PHR, and more preferably 10 to 60 PHR. Particularly preferred polymaleimide compounds have the formula:

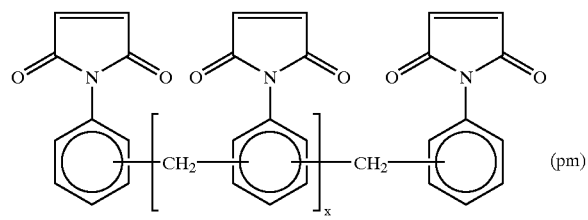

(pm)

wherein x is from about 1 to 100. Such polymaleimides are common materials of commerce and are sold under different trade names by different companies. Amounts of maleimide typically range from 0 to 100 PHR, preferably 5 to 100 PHR, more preferably from 5 to 50 PHR of halogen-containing film former.

Another adhesion promoter, acting also as an acid acceptor is the class of epoxy resins. Preferred epoxy resins are polyglycidyl polyethers of polyhydric phenols. These phenolic-epoxy resins are complex polymeric reaction products of polyhydric phenols with polyfunctional halohydrins and/or glycerol dichlorohydrin. The products thus obtained contain terminal epoxy groups. A large number of epoxy resins of this type are disclosed in Greenlee U.S. Pat. Nos. 2,585,115 and 2,589,245. Several of these resins are available commercially. Suitable polyhydric phenols useful in the preparation of the phenolic epoxy resins used herein include resorcinol and novolac resins resulting from condensation of phenol with formaldehyde. The phenol/formaldehyde molar ratio, coupled with the type of catalyst, determines whether the resulting polymer is phenol terminated or methylol terminated; phenol-terminated are referred to as novolacs. These are produced from a reaction mixture having a formaldehyde/phenol molar ratio between 0.5 and 0.8 in the presence of an acid catalyst. Resorcinol is a very reactive dihydric phenol with formaldehyde, allowing for the preparation of resorcinol-formaldehyde novolacs.

Phenolic epoxy resins may be further characterized by reference to their epoxy weight of pure epoxy resins being the mean molecular weight of the resin divided by the mean number of epoxy radicals per molecule or in any case the number of grams of epoxy resin equivalent to one mole of the epoxy group or one gram equivalent of epoxide. The phenolic epoxy resins that may be used in the present invention have an epoxy equivalent weight of about 400–1000. Amount of epoxy resin, such as phenolic epoxy, used in the adhesive may be from 0 to about 80 parts by weight per 100 parts by weight of said halogen-containing polyolefin, preferably from about 2 to about 80 PHR, more preferably from 2 to 50 PHR.

Optional vulcanizing agents that are suitable for use in one-coat embodiments not used in conjunction with metal primers, are sulfur and selenium. The vulcanizing agents are well known and commercially available. An amount of vulcanizing agent in the adhesive composition may be from 0 to about 40 parts by weight per 100 parts of halogen-containing polyolefin, preferably 2 to 30 PHR, and more preferably from 5 to 30 PHR.

If desired, the adhesive compositions of the invention can include conventional additives such as inert filer material, like barium sulfate, polymeric film-forming adjuncts, pigments, solvent and the like, with the amounts of such additions being within the range customarily employed. A particularly preferred filler is carbon black and when utilized is incorporated in amounts ranging from 0 to 20% by weight on a dry solids basis. Silicates, such as fumed silica, or hydrated silica are preferably used at levels of 0.2 to 2% to total weight of adhesive.

An amount of metal scavenger comprising zinc phosphate, effective as replacement for lead compounds is from 10 to 120 PHR, preferably 12 to 80 PHR. The phosphates as phosphoric acid salts usable in the preparation of metal phosphate component are, for example, aluminum phosphate, zinc phosphate, and aluminum dihydrogentripolyphosphate. Aluminum dihydrogentripolyphosphate is particularly preferably used in the present invention. The aluminum phosphates can be treated with the Zn compounds in conventional methods such as follows. The treatment with a Zn compound can be effected after obtaining aluminum dihydrogentripolyphosphate. As a treatment method, particles of aluminum dihydrogentripolyphosphate are dispersed in a solution containing a Zn ion and the Zn ion is deposited as the hydroxide on the surface of the particles of aluminum dihydrogentripolyphosphate by changing the pH of the solution from a weak acidic side to an alkaline side by amines. Thereafter, the zinc hydroxide on the surface is converted to zinc oxide by filtering, washing with water, drying and heat-treating. The substances capable of delivering a Zn ion for preparing a solution containing a Zn ion include zinc chloride, zinc hydroxide, zinc nitrate, zinc carbonate, zinc sulfate etc., phosphates treated with Zn compounds, particularly, aluminum dihydrogentripolyphosphate can provide excellent durability of adhesive properties.

Zn components are included in or coated on the particles of aluminum phosphate by, for example, adsorption or absorption. The phosphates treated with Zn compounds can be used alone or preferably in mixtures with aluminum and/or zinc oxides. A more preferred acid scavenger is a mixture of 25–35 wt. % zinc oxide, 25–35 wt. % zinc phosphate and 25–35 wt. % aluminum phosphate (Zn/Al phos.). The most preferred acid scavenger comprises zinc phosphate in a 1:1:1 mixture of zinc oxide, zinc phosphate and aluminum phosphate. Such mixtures are sold by Heubach Company.

The preferred embodiment includes a 20–50 parts of metal oxide such as zinc oxide in combination with 100 parts of zinc phosphate. The amount of acid scavenger comprising zinc phosphate present in the adhesive composition ranges from about 5 to about 120 parts by weight per 100 parts of halogen-containing polyolefin (PHR), preferably from 10 to about 120 PHR, and more preferably from 12 to 80 PHR.

The adhesive compositions of this invention are prepared by conventional means. For ease of application, as is conventional in this art, the components will be mixed and dispersed in an inert liquid diluents which, once the composition has been applied to the substrate, can be readily evaporated. Examples of suitable liquid diluents are water, aromatic and halogenated aromatic hydrocarbons such as benzene, toluene, xylene, chlorobenzene, dichlorobenzene, and the like; halogenated aliphatic hydrocarbons such as trichloroethylene, perchloroethylene, propylene dichloride and the like; ketones such as methyl ethyl ketone, methyl isobutyl ketone, and the like; ethers, naphthas, etc., including mixtures of such carriers. Preferred diluents are xylene and toluene, ortho- and para-chlorotoluene, optionally in combination with tetrachloroethylene. The amount of the diluent employed is that which provides a composition suitable for use as an adhesive. Typical diluent amount, by weight to total adhesive weight ranges from 20 to 4000 parts per hundred weight parts of all halogen-containing film former (PHR). This amount will ordinarily be such as to provide a total solids content ranging from about 5% to 80%, preferably about 15% to about 40% percent by weight. In terms of preferred wt. Parts of diluent per 100 wt. parts of halogen-containing polyolefin, the diluent can be used in an amount ranging from 200 to 1000 PHR of halogenated film former.

When water is used as a diluent, the finely divided solid components should be predispersed using dispersing agent such as lignosulfonates including as a basic lignin monomer unit a substituted phenyl propane. These are commercially available under the trade designation as Marasperse® from Ligno Tech U.S.A. and water, which can assist in achieving a desirable uniform aqueous coating of the adhesive on the substrate surface.

The adhesives herein may be coated on a primer or directly applied to the substrate. The metal surface to which the elastomeric substrate is ultimately bonded to may optionally have a conventional water-based or solvent-based metal primer applied thereto. Typical conventional water-based primers include phenolic resin-type primers such as CHEMLOK 802, CHEMLOK 805, CHEMLOK 8006, and CHEMLOK 8401 produced by Lord Corporation. Typical solvent-based primers include phenolic resin-type primers such as CHEMLOK 205 or CHEMLOK 207 produced by Lord Corporation. The adhesive composition is typically applied directly to a metal surface or directly to any primer which has been applied to the metal so as to ensure contact between the adhesive composition and the elastomeric substrate which is brought into contact with the coated metal surface.

The adhesive compositions of the present invention have been found to be particularly useful for bonding a wide variety of elastomeric materials, including both vulcanized and vulcanizable elastomeric materials, to themselves or to other substrates, particularly to metal substrates. Elastomers which can be bonded include without limitation natural rubber, polychloroprene rubber, styrene-butadiene rubber, nitrile rubber, ethylene/propylene copolymer rubber (EPM); ethylene/propylene/diene terpolymer rubber (EPDM); butyl rubber, polyurethane rubber, PAREL type elastomers, and the like. Other substrates which can be effectively bonded to themselves or to elastomers include fabrics such as fiberglass, polyamides, polyester, aramides, e.g., Kevlar, a trademark of E. I. du Pont de Nemours Co., (Inc.), of Wilmington, Del., glass, ceramics and the like. Metals and their alloys to which the elastomers can be bonded include steel, stainless steel, lead, aluminum, copper, brass, bronze, Monel metals, nickel, zinc, and the like, including treated metals such as phosphatized steel, galvanized steel, and the like.

The adhesive compositions are applied to substrate surfaces in a conventional manner such as by dipping, spraying, brushing, and the like. Preferably, the substrate surfaces are allowed to dry after coating before being brought together. After the surfaces have been pressed together with the adhesive layer in between, the assembly is heated in accordance with conventional practices. The exact conditions selected will depend upon the particular elastomer being bonded and whether or not it is cured. If the rubber is uncured, the curing is to be effected during bonding, the conditions will be dictated by the rubber composition and will generally be at a temperature of from about 140° C. to about 200° C. for from about 5 to about 60 minutes. If the rubber is already cured, the bonding temperature may range from about 90° C. to above 180° C. for from 15 to about 120 minutes. Alternatively, in situations where applicable, the adhesives can be interspersed between the surfaces to be joined as a solid film or tape (100% TSC adhesive system) with bonding being accomplished as before.

EXAMPLES

The following examples are provided for purposes of illustrating the invention, it being understood that the invention is not limited to the examples nor to the specific details therein enumerated. In the examples, amounts are parts by weight, unless otherwise specified. Metal coupons were treated with commercial primers A and B. They were spray applied to zinc phosphatized steel coupons at 0.30 mil dry film thickness (DFT). Adhesive was sprayed over dried each primer at 0.70 mil DFT. Adhesive was also used as a one coat (Ex. 1C) at 1.0 mil DFT. The elastomer used was a conventional natural rubber compound and was injection molded at 350° F./176° C. for 11 minutes. Some parts where pre-baked prior to molding to evaluate the resistance to time delays in typical manufacturing processes.

Primary Adhesion (PA) was measured in accordance with ASTM D429 Method B. Parts were destroyed on the 3 station United Tester at ambient, speed was 20"/min @ a 45 degree angle. The maximum force required to remove the rubber or have the rubber stock break is recorded along with the percent of rubber remaining on the part. A part having 100% rubber retention is the best attainable adhesion failure mode.

Hot Tear (HT) testing is performed by placing part in an oven at 300° F. for 15 minutes and immediately destroying the part on the 3 station United Tester at a speed of 20"/minute @ a 45 degree angle.

The boiling water (BW) test is performed by fastening the part in a fixture where the angle from the bond line to the rubber tail is 45 degrees. The tail is fastened to a cable where a 5-pound free weight is attached. The parts are immersed in this environment for a 2-hour duration. Parts are removed from the fixture and allowed to cool to ambient. The parts are destroyed manually by peeling the rubber from the substrate with needle nose pliers and the bond area is evaluated for rubber retention.

Salt spray (SS) testing is performed by applying a constant stress to the bond line by pulling the rubber tail and fastening the tail while the part is stressed. The part is then placed in a 5% salt fog at 95° F. for a 1-week period. Parts are destroyed as in the above peeling and evaluated the same as the boiling water specimens.

The propylene glycol (PG) test is carried out by immersing stressed parts in a container of propylene glycol and the container is closed and placed in an oven at 250° F. for 5 days. Bonded parts are evaluated the same manner as salt spray and boiling water.

| Raw Materials | |
|---|---|
| Masterbatch | Dry weight |
| Nitroso compound | 7.12 |
| Carbon Black | 14.25 |
| Chlorinated NR | 3.08 |
| Zn/Al phos. | 6.01 |
| Xylene | 56.568 |

-continued

| Raw Materials | | |
|---|---|---|
| Adhesive | Wet | Dry |
| Chlorinated NR | 8.791 | 27.23 |
| Epoxy resin | 0.402 | 1.38 |
| Chlorinated NR | 8.758 | 30.2 |
| Brominated DCD | 6.211 | 10.71 |
| Toluene | 7.484 | 0 |
| TSC: 29.00% | | |

In the Tables: PA=Primary Adhesion, at 0', 3' time of pre-bake;

HT=Hot Tear, at 0', 3'—time of pre-bake;

BW=Boiling Water, 0', 3'—time of pre-bake;

SS=salt spray;

Std. Dev.=standard deviation.

Av. % R=average % rubber retained after peeling from the substrate.

Example 1A
Adhesive Over Commercial Primer A

| Test | PA-0' | PA-3' | HT-0' | HT-3' | BW-0' | BW-3' |
|---|---|---|---|---|---|---|
| Comparative | 100 | 100 | 100 | 100 | 98 | 98 |
| Example 1 | 100 | 100 | 100 | 100 | 99 | 98 |

| Test | SS-0' | SS-3' | PG-0' | PG-3' | Avg % R | Std. Dev. |
|---|---|---|---|---|---|---|
| Comparative | 94 | 96 | 55 | 81 | 92.2 | 14.3 |
| Example 1 | 95 | 98 | 85 | 71 | 94.6 | 9.5 |

Example 1B
Adhesive Over Commercial Primer B

| Test | PA-0' | PA-3' | HT-0' | HT-3' | BW-0' | BW-3' |
|---|---|---|---|---|---|---|
| Comparative | 100 | 100 | 100 | 100 | 100 | 98 |
| Example 1 | 100 | 84 | 100 | 80 | 100 | 74 |

| Test | SS-0' | SS-3' | PG-0' | PG-3' | Avg % R | Std. Dev. |
|---|---|---|---|---|---|---|
| Comparative | 100 | 100 | 85 | 100 | 98.3 | 4.7 |
| Example 1 | 100 | 95 | 100 | 100 | 93.3 | 10.0 |

Example 1C
Adhesive as a One-Coat

| Test | PA-0' | PA-3' | HT-0' | HT-3' | BW-0' | BW-3' |
|---|---|---|---|---|---|---|
| Comparative | 100 | 95 | 100 | 100 | 73 | 18 |
| Example 1 | 100 | 100 | 100 | 100 | 44 | 29 |

| Test | SS-0' | SS-3' | PG-0' | PG-3' | Avg % R | Std. Dev. |
|---|---|---|---|---|---|---|
| Comparative | 83 | 83 | 58 | 16 | 72.6 | 32.3 |
| Example 1 | 93 | 73 | 61 | 16 | 71.6 | 32.4 |

| Summary Data | Avg % R | STD |
|---|---|---|
| CH 256 | 87.7 | 14.0 |
| Example 1 | 86.5 | 13.1 |

Example 2
Comparison of Acid Scavengers

| | DRY PARTS OF RAW MATERIALS | | | | | | | | | | | | |
|---|---|---|---|---|---|---|---|---|---|---|---|---|---|
| | CONT. | A | B | C | D | E | F | G | H | I | J | K | L |
| Phenolic dispersion | 75 | 75 | 75 | 75 | 75 | 75 | 75 | 75 | 75 | 75 | 75 | 75 | 75 |
| Chlorosulfonated polyethylene | 25 | 25 | 25 | 25 | 25 | 25 | 25 | 25 | 25 | 25 | 25 | 25 | 25 |
| ZINC OXIDE | 0 | 5 | 10 | 15 | | | | | | | | | |
| DIBASIC LEAD PHOSPHITE | 0 | | | | 5 | 10 | 15 | | | | | | |
| Zn/Al Phos. | 0 | | | | | | | 5 | 10 | 15 | | | |
| HYDROTALCITE | 0 | | | | | | | | | | 5 | 10 | 15 |

Substrate: Grit-Blasted Copper Coupons

Rubber: Commercial peroxide cured EPDM, cured 7.5 minutes at 340° F. (171° C.).

Adhesives: The adhesives were spray applied to provide approximately a 1.0 mils dry film thickness and the bonding area was 1"×1" (2.54 cm.×2.54 cm.)

Environmental test: The bonded parts were subjected to autoclave steam heat environment for 100 hours at 50 psi. The bonded parts were then removed from the autoclave and were hand peeled with pliers to determine how much rubber was retained on the 1 inch bond area. A percentage of rubber retained is then assigned after visual inspection. The parts were also either not baked or baked in an oven 5'@340° F. (171° C.) prior to the molding cycle.

| | NOT BAKED | BAKED 5' @ 340 F. |
|---|---|---|
| Control Adhesive | 15% RUBBER | 85% RUBBER |
| A | 40% RUBBER | 40% RUBBER |
| B | 8% RUBBER | 2% RUBBER |
| C | 75% RUBBER | 50% RUBBER |
| D | 1% RUBBER | 10% RUBBER |
| E | 8% RUBBER | 8% RUBBER |
| F | 0% RUBBER | 2% RUBBER |

-continued

|   | NOT BAKED | BAKED 5' @ 340 F. |
|---|---|---|
| G (invention) | 85% RUBBER | 97% RUBBER |
| H (invention) | 43% RUBBER | 100% RUBBER |
| I (invention) | 98% RUBBER | 100% RUBBER |
| J | 5% RUBBER | 0% RUBBER |
| K | 2% RUBBER | 0% RUBBER |
| L | 0% RUBBER | 0% RUBBER |

The improvement in rubber retention using a mixture of Zn/Al phos. in Examples F, G and H, providing compared to zinc oxide alone, as taught in U.S. Pat. No. 5,268,404, and dibasic lead was unexpected. Dibasic lead phosphite is recognized as the industry standard. Bonds between rubber and metal using the formulation in accordance with the invention examples G, H and I demonstrate excellent resistance to harsh environments.

Primary adhesion was evaluated between metal and EPDM using adhesives comprising 75 wt. parts phenolic dispersion and levels for Zn/Al phos. and chlorosulfonated polyethylene indicated in the following table. Bonded parts were pulled apart at 2" (5.08 cm) per minute at a 45° angle at room temperature. Percent rubber retained on the metal substrate is indicated in the following table:

| Wt. Parts. Zn/Al Phos. | 10 parts Hypalon 4500 | 15 parts Hypalon 4500 | 20 parts Hypalon 4500 | 25 parts Hypalon 4500 |
|---|---|---|---|---|
| 20 parts | 100% Rubber | 98% Rubber | 100% Rubber | 100% Rubber |
| 15 parts | 60% Rubber | 75% Rubber | 90% Rubber | 100% Rubber |
| 10 parts | 85% Rubber | 78% Rubber | 88% Rubber | 80% Rubber |
| 0 parts | 70% Rubber | 5% Rubber | 5% Rubber | 48% Rubber |

Excellent results are shown above for an adhesive consisting essentially of, on a weight basis, from 60%–80% of a phenolic resin., 8%–25% of chlorinated polyolefin and from 9%–25% of a mixture of aluminum phosphate, zinc phosphate and zinc oxide.

What is claimed is:

1. An adhesive composition containing less than 1000 ppm of lead, and comprising
   (a) at least one diluent comprising water or organic solvent,
   (b) a halogen-containing polyolefin,
   (c) optional nitroso compound,
   (d) an acid scavenger comprising zinc phosphate, and optionally
   (e) an adhesion promoter.

2. The adhesive of claim 1 wherein said halogen-containing polyolefin is chlorosulfonated polyethylene, said nitroso compound (c) is present and is a poly-C-nitroso compound, and said adhesive further comprises carbon black, and silica.

3. The adhesive of claim 1 containing the following:
   (a) from 20 to 4000 PHR of said diluent,
   (b) 100 weight parts of said halogen-containing polyolefin;
   (c) from 1 to 200 wt. parts 100 wt. parts of said halogenated polyolefin (PHR), of said nitroso compound;
   (d) from 5 to 120 PHR of said acid scavenger comprising zinc phosphate;
   (e) from 0 to 25 PHR, of said adhesion promoter.

4. The adhesive composition according to claim 1, wherein the halogen-containing polyolefin is selected from the group consisting of chlorinated natural rubber, chlorosulfonated polyethylene, chlorinated ethylene/propylene/non-conjugated diene terpolymers and mixtures thereof.

5. The adhesive composition according to claim 1 wherein (b) is chlorinated natural rubber (c) is an aromatic nitroso compound and further comprising a second halogen-containing polyolefin which is brominated polydichlorobutadiene, and (e) a maleimide compound.

6. The adhesive composition according to claim 1 wherein (b) is a combination of chlorinated natural rubber and chlorosulfonated polyethylene, (c) is an aromatic nitroso compound and (e) is a polyisocyanate compound.

7. The adhesive composition according to claim 1 wherein the nitroso compound is an aromatic nitroso compound present in an amount from 1 to 200 PHR, the said adhesion promoter is a maleimide compound present in an amount from 5 to 100 PHR, and said acid scavenger comprising zinc phosphate is present in an amount from 10 to 120 PHR.

8. An adhesive composition according to claim 7 wherein the aromatic nitroso compound is present in an amount from 50 to 150 PHR, the maleimide compound is present in an amount from 12 to 80 PHR and zinc phosphate is present in an amount from 12 to 80 PHR.

9. An adhesive composition according to claim 1 further comprising a vulcanizing agent selected from the group consisting of sulfur and selenium.

10. An adhesive composition according to claim 9 wherein the vulcanizing agent is present in an amount from 5 to 30 parts by weight per 100 parts by weight of halogen-containing polyolefin.

11. An adhesive composition according to claim 1 wherein (e) is selected from a phenolic resin solution, a phenolic resin dispersion, and a phenolic epoxy resin.

12. An adhesive composition according to claim 11 wherein (e) is a novolak epoxy resin.

13. An adhesive composition according to claim 11 wherein the phenolic epoxy resin is present in an amount from about 2 to 50 parts by weight per 100 parts by weight of halogen-containing polyolefin.

14. An adhesive composition comprising
   (a) from 20 to 4000 parts per 100 parts of (b) (PHR) of a diluent,
   (b) 100 weight parts of at least one chlorinated natural rubber;
   (c) from 1 to about PHR of a nitroso compound and 1 to 200 PHR of a brominated polydichlorobutadiene;
   (d) from about 5 to about 120 PHR of an acid scavenger comprising zinc phosphate;
   (e) from 1 to about 200 PHR, of an adhesion promoter selected from the group consisting of a maleimide compound, phenolic resin, epoxy resin, and a polyisocyanate, including mixtures thereof.

15. An adhesive composition comprising
   (a) from 20 to 4000 parts per 100 parts of (b) (PHR) of a diluent,
   (b) 100 weight parts of at least one chlorosulfonated polyethylene;
   (c) from about 1 to 200 PHR of a nitroso compound and 1 to 200 PHR of a brominated polydichlorobutadiene;

(d) from 5 to about 120 PHR of an acid scavenger comprising zinc phosphate;
(e) from 1 to 200 PHR, of an adhesion promoter selected from the group consisting of a maleimide compound, a phenolic resin, and epoxy resin, a polyisocyanate, and mixtures thereof.

* * * * *